United States Patent Office 3,006,961
Patented Oct. 31, 1961

3,006,961
BORINE CARBONYLS AND THEIR PRODUCTION
Walter Reppe, Heidelberg, and August Magin, Mutterstadt-Pfalz, Germany, assignors to Badische Anilin- & Soda-Fabrik Aktiengesellschaft, Ludwigshafen am Rhine, Rheinland-Pfalz, Bundesrepublik Deutschland
No Drawing. Filed Aug. 11, 1959, Ser. No. 832,901
Claims priority, application Germany Aug. 13, 1958
12 Claims. (Cl. 260—606.5)

This invention relates to borine carbonyls and especially to new compounds derived from borine carbonyl by substitution of the hydrogen atoms by hydrocarbon radicals, and also borine carbonyls derived from the hypothetical (i.e. not yet known) carbonyls of higher boron hydride compounds by partial or complete substitution of the hydrogen atoms by hydrocarbon radicals.

The invention further relates to a new process for the production of these borine hydrocarbon carbonyls.

It is known that diborane combines under certain conditions with carbon monoxide to form the unstable, readily dissociating $BH_3CO$, the so-called borine carbonyl. According ot the known method, diborane is heated with a large excess of carbon monoxide in a bomb at 100° C. After a short time there is thereby set up an equilibrium state:

$$2CO + B_2H_6 \rightleftarrows 2H_3BCO$$

which can be fixed temporarily by rapid cooling so as to render possible the separation of the borine carbonyl formed by fractional condensation. Borine carbonyl however decomposes reversibly into its two components diborane and carbon monoxide even at room temperature and is therefore highly unstable.

We have now found that borine carbonyls substituted by hydrocarbon radicals are obtained by allowing a boron hydride, an unsaturated hydrocarbon and carbon monoxide to react on each other. These new compounds, in contradistinction to simple borine carbonyl which contains no hydrocarbon radicals, are stable.

There are a number of possibilities for carrying out the process. For example an unsaturated hydrocarbon and carbon monoxide may be allowed to act successively or simultaneously on boron hydride. If the unsaturated hydrocarbon and the carbon monoxide are used consecutively, either sequence may be adopted, i.e. boron hydride may be reacted, first with the unsaturated hydrocarbon and then with the carbon monoxide, or first with the carbon monoxide and then with the unsaturated hydrocarbon. In these embodiments there is also the choice, in adaptation to the exigencies of the operation, of carrying out the reaction with the two reaction components in the chosen chronological sequence in one stage, for example in one reaction vessel, or in two stages; it is immaterial whether the intermediate products are isolated or not. Unstable intermediate products, as for example the preliminarily formed carbonyls of boron hydride, are preferably not isolated, because they can only be stabilized by freezing the reaction equilibrium established during their formation from boron hydride and carbon monoxide and this is troublesome and expensive. On the other hand it is possible and often preferable to separate preliminarily formed stable substituted boron hydrides and to react these in a second stage with carbon monoxide. These substituted boron hydrides, e.g. boron alkyls, may have been prepared by methods other than by reaction of boron hydrides with unsaturated hydrocarbons, as for example by treatment of boron halides, especially boron trifluoride, with Grignard reagents.

The various but mutually equivalent methods of preparing the new compounds are visibly shown in a convenient manner by the following reaction scheme:

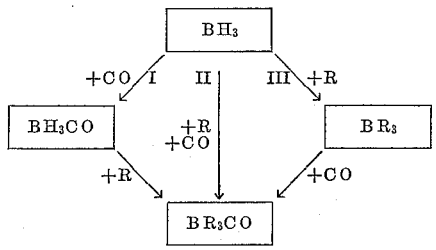

In this scheme R represents a hydrocarbon with at least one double linkage capable of addition.

In addition to the methods illustrated by the scheme above, the new compounds may also be obtained from boranes in which the hydrogen atoms are substituted wholly or partly by hydrocarbon radicals and which have been prepared by another method as above described, by reaction with carbon monoxide under pressure.

The new borine carbonyls prepared according to this invention have the general formula:

$$[(BR_1R_2R_3)CO]_n$$

in which $n$ is one of the numbers 1, 2, 3 and 4, especially 1, 2, or 3, $R_1$ represents hydrogen, an alkyl radical with 2 to 18 carbon atoms, a cycloalkyl radical with 5 to 12 carbon atoms or an aralkyl radical, $R_2$ represents hydrogen or an alkyl radical with 2 to 18 carbon atoms, a cycloalkyl radical with 5 to 12 carbon atoms or an aralkyl radical and $R_3$ represents an alkyl radical with 2 to 18 carbon atoms, a cycloalkyl radical with 5 to 12 carbon atoms or an aralkyl radical. By aralkyl radicals we mean radicals derived from an ethyl radical by substitution of one or more, preferably two, hydrogen atoms by phenyl or tolyl radicals or by substitution of two hydrogen atoms by methyl and phenyl or tolyl radicals.

If in the last-mentioned method of preparing these compounds, a start is made direct from the substituted boranes which have been prepared either by reaction of diborane with hydrocarbon compounds having an olefinic double linkage in accordance with the above reaction scheme or in any other way, then the initial materials used are compounds of the general formula $B(R_1R_2R_3)$ in which $R_1$, $R_2$ and $R_3$ have the above meanings. The most important compounds of this type are the completely substituted boron hydrides. The compounds of the general formula $[B(R_1R_2R_3)CO]_n$, in which $R_1$, $R_2$, $R_3$ and $n$ have the meanings specified above and in which one or two of the substituents $R_1$, $R_2$ or $R_3$ stand for hydrogen, are preferably obtained by reacting a completely substituted boron hydride with carbon monoxide while adding a boron hydride.

By unsaturated hydrocarbons there are to be understood in accordance with this invention hydrocarbon compounds which are capable of reacting by way of an unsaturated linkage with the hydrogen atoms of boron hydride with the formation of substituted boron hydrides, for example, aliphatic, cycloaliphatic or araliphatic hydrocarbons which are unsaturated, especially those which are olefinically or ethylenically unsaturated, one or more times. Those compounds which have only one olefinic double bond are especially useful in order to avoid mixed products. There may be mentioned especially aliphatic hydrocarbons with 2 to 18 carbon atoms, such as ethylene propylene, butylenes, hexylenes, octylenes, dodecylene, octadecylene, or the dienes of these hydrocarbons, such as butadiene and isoprene. Also useful are the unsaturated cycloaliphatic hydrocarbons with 5 to 12 carbon atoms and 1 to 3 olefinic double linkages, such as cyclopentadiene, cyclohexene, cyclohexadiene, cyclo-octene, cyclo-octadiene, cyclo-octatriene and cyclohexatriene. Useful araliphatic hydrocarbons of which the alkylene groups are capable of the same addition are for example substances derived from ethylene by replacement of one or two hydrogen atoms by phenyl or tolyl radicals and possibly alkyl radicals, such as styrene, alpha- and beta-methylstyrene and stilbene. These substances, like those of the alkylene or cycloalkylene series may for example be branched and substituted in any desired way.

The intermediate products formed by the reaction of diborane ($B_2H_6$) with the above-mentioned unsaturated hydrocarbons are in part new substances and are formed in almost quantitative yields merely by bringing the reactants together. These substances are stable and can be directly isolated before the further reaction with carbon monoxide. This reaction proceeds even at room temperature and atmospheric pressure with almost quantitative yields.

In carrying out the process of producing the carbonyls, diborane and an unsaturated hydrocarbon, for example, may be introduced simultaneously or consecutively into a solvent and then, without isolation of the boron alkyl, the treatment with carbon monoxide is carried out. However, it is also possible to dissolve the boron alkyls preformed in a first stage in a solvent and treat them with carbon monoxide in a second stage. A further possibility consists in first allowing carbon monoxide to act on dissolved diborane and then adding a corresponding amount of an unsaturated hydrocarbon in gas or liquid phase. According to this invention the reaction may however also be carried out by allowing diborane and carbon monoxide to act simultaneously on an unsaturated hydrocarbon dissolved in a suitable solvent, or by allowing an unsaturated hydrocarbon and carbon monoxide to act simultaneously on dissolved diborane.

Suitable solvents are substances which do not enter into reaction with boron hydrides or carbon monoxide under the reaction conditions, i.e. inert organic solvents. There may be used for example saturated aliphatic hydrocarbons having a non-reactive structure, as for example: gasoline; cycloaliphatic hydrocarbons, such as cyclohexane, cyclo-octane and decahydronaphthalene; or aromatic hydrocarbons, such as benzene and toluene; and especially ethers, such as diethyl ether and dibutyl ether; and preferably cyclic ethers, such as tetrahydrofurane, dioxane and tetrahydropyrane. The unsaturated hydrocarbon itself may also act as the solvent for the reaction as a liquid in combination with the inert solvent or alone by having an excess thereof present. It is essential that the process should be carried out in the absence of water. It is therefore necessary to employ absolutely anhydrous solvents and to remove even traces of water or water vapor from the initial materials, e.g. the gaseous or liquid olefinic hydrocarbons and carbon monoxide.

The action of carbon monoxide, independently of the reaction sequence, takes place under increased pressure, for example at 5 to 500 atmospheres, advantageously at 50 to 200 atmospheres. Besides pure carbon monoxide, there may also be used a carbon monoxide which is diluted with other gases which do not take part in the reaction, such as nitrogen, methane or similar inert gases.

The reaction of boron hydride with carbon monoxide by reaction sequence I of the above scheme is in general carried out at temperatures of 0° to 150° C., preferably at a temperature which corresponds approximately to room temperature, as for example 15° to 50° C. In the second step under reaction sequence I wherein the hydrocarbon is reacted with the preformed borine carbonyl, the same temperature may be used, while the carbon monoxide pressure, if desired a smaller carbon monoxide pressure, is preferably maintained in order to counteract the reversible decomposition of the borine carbonyl into boron hydride and carbon monoxide. The hydrocarbon may be added in liquid phase or forced in against the pressure prevailing in the reaction vessel.

In reaction sequence II, i.e. by the simultaneous reaction of carbon monoxide and hydrocarbon with boron hydride, the reaction is carried out under the above-mentioned carbon monoxide pressures at comparable temperatures, i.e. in general at 0° to 150° C., preferably at 15° to 50° C.

According to the first stage of reaction sequence III, i.e. in the reaction of boron hydride with the hydrocarbon, however, it is advantageous to work at atmospheric pressure because the reaction proceeds exothermically. It is however possible to use moderate excess pressure, for example 1 to 20 atmospheres, but provision must be made for the withdrawal of the heat liberated in the reaction. The reaction proceeds at temperatures of −30° to +100° C., advantageously at lower temperatures, for example at −10° to +40° C. The subsequent reaction with carbon monoxide on the substituted boron hydride in the second step of the reaction sequence III then takes pace under the above-mentioned carbon monoxide pressure at temperatures of 0° to 150° C., advantageously 50° to 150° C.

The process may be carried out discontinuously, for example in suitable autoclaves or shaking or rolling bombs, or also continuously. When working continuously, the boron hydride dissolved in a suitable inert solvent or a dissolved preformed substituted boron hydride may be continuously introduced into the lower end of a pressure-tight reaction vessel in the form of a tower, and a suspension or solution of the carbonyl being formed is withdrawn at the upper end of the reaction vessel, while the unsaturated hydrocarbon and carbon monoxide or carbon monoxide alone are circulated through the reaction vessel. The circulation of the gaseous reactants may be promoted by a pump. It is possible to work in cocurrent or countercurrent flow of reactants in the continuous reaction. When recycling the carbon monoxide and possibly the gaseous unsaturated hydrocarbon, it is preferable to provide for the maintenance of a definite level of extraneous gases or gaseous impurities present by bleeding off a definite amount of the recycled gas.

The stable borine carbonyls prepared according to this invention are, with a few exceptions, substances which are well crystallized and of which the molecular weight corresponds one or more times to the lowest molecular configuration $[(BR_1R_2R_3)CO]$. By heating, a polymerization of the lower molecular carbonyls may take place and the crystalline carbonyls will thus often liquefy. It is however also possible to obtain the higher polymers during the actual production by appropriately varying the reaction conditions.

The carbonyl compounds prepared according to the process, in contrast to the known simple borine carbonyl of the formula $BH_3CO$, show no tendency whatever under normal conditions to decompose into boron alkyls and carbon monoxide. Unlike simple borine carbonyl, they are also stable to air and oxygen.

The substances may be used as additives to fuels for internal combustion engines. They have the property of raising the octane number of gasoline. The new compounds are also useful in that they are stable solid or liquid materials containing carbon monoxide which will be released only under extreme conditions. By heating the dimeric lower boron alkyl carbonyls to 150 to 350° C., especially 200 to 300° C., the molecular weight is increased and new and useful polymeric products are obtained. By heating, for example, the triethyl or tri-normal-propyl borine carbonyls for about 2 hours at about 250° C., there is obtained a polymeric product of molecular weight 1,200, which is 10 times the monomeric figure.

The following examples will further illustrate this invention but the invention is not restricted to these examples.

Example 1

Into a rolling autoclave of 4.5 liters capacity which has been flushed out with nitrogen and then evacuated there is sucked in while excluding air a solution of 114 grams of tri-normal-propyl boron in 1550 grams of anhydrous tetrahydrofurane. After 50 atmospheres of carbon monoxide have been forced in, the autoclave is allowed to rotate. The pressure then falls rapidly while there is a slight rise in temperature. By continuously forcing in carbon monoxide, the pressure is kept at first between 50 and 100 atmospheres and, after the reaction has substantially died away, between 150 and 200 atmospheres until no further decrease in pressure takes place. This is the case after about 2½ hours. The pressure decrease amounts in all to 111 atmospheres. The temperature in the pressure vessel rises from 12° to 18° C. during the reaction.

The vessel is then decompressed and the water-clear liquid constituting the contents is subjected to distillation under slightly reduced pressure to remove the tetrahydrofurane and then further distilled in a high vacuum; 101 grams of a distillate of the boiling point 115° to 130° C. at 0.3 mm. Hg which solidifies to a white crystalline mass and 32 grams of a viscous oily residue are obtained. The crystalline portion of the distillate is freed from adherent oil by squeezing off and washing on a suction filter with cold acetonitrile and then dried. In this way 69 grams of the bimolecular tri-normal-propyl borine carbonyl $(B(C_3H_7)_3CO)_2$, of the melting point 58° to 59° C. are obtained in practically pure form. From the filtrate obtained by pressing and washing the distillate, the acetonitrile is first driven on under slightly reduced pressure, the residual oil united with the oil obtained as a residue in the first distillation and fractionally distilled in vacuum. Besides a first runnings of 8.2 grams and an after-runnings of 7.4 grams, there are obtained 25.2 grams of the trimolecular tri-normal-propyl borine carbonyl $(B(C_3H_7)_3CO)_3$, of the boiling point 165° to 169° C. at 0.3 mm. Hg, as a pale viscous liquid.

Example 2

A solution of 27.8 grams of triethyl boron in 542 grams of anhydrous diethyl ether is reacted with carbon monoxide as described in Example 1. In the course of 2½ hours, with a temperature rise from 12° to 18° C., an amount of carbon monoxide corresponding to a pressure decrease of 93 atmospheres is absorbed.

The reaction mixture, consisting of a pale clear solution, after the ether has been driven off, is subjected to fractional distillation. After a slight first runnings, there are thereby obtained 25.5 grams of a fraction of the boiling point 65° to 67° C. at 0.1 mm. Hg and, after withdrawal of an intermediate fraction, a further fraction of 6.7 grams of the boiling point 108° to 110° C. The first fraction is a lower molecular triethyl borine carbonyl and the last fraction is a higher molecular triethyl borine carbonyl.

Example 3

A solution of 9 grams of tricyclohexyl boron, prepared from cyclohexene and diborane, and 60 grams of anhydrous tetrahydrofurane is treated with carbon monoxide in a shaking autoclave of ¼ liter capacity at 20° to 22° C. and a pressure of 140 to 175 atmospheres; the pressure falls in about half an hour by 35 atmospheres, after which it remains constant. The reaction mixture consists of a white, crystalline precipitate and a water-clear liquid. The liquid is filtered off by suction from the precipitate, the latter washed on the suction filter with tetrahydrofurane and then dried. 6 grams of practically pure dimeric tricyclohexyl borine carbonyl $$(B(C_6H_{11})_2CO)_2$$

of the melting point 260 are obtained. From the filtrate, after distilling off the tetrahydrofurane, another 0.3 gram of the crystalline product separates and is separated by filtration from a further liquid reaction product consisting of 2.7 grams. From the liquid product there is obtained, finally, by fractional distillation in vacuo, besides a first and last runnings, a fraction of 1 gram of the boiling point 170° to 184° C. which consists of a fairly pure monomolecular tri-cyclohexyl borine carbonyl $$(B(C_6H_{11})_3CO)$$

Example 4

A solution consisting of 102 grams of tri-(beta-phenyl-ethyl) boron, prepared from styrene and diborane, in 251 grams of anhydrous tetrahydrofurane is reacted, as described in Example 1, with carbon monoxide under a pressure of 150 to 200 atmospheres until saturation is reached. In the course of 3 hours, the pressure decreases in all by 47 atmospheres.

The reaction mixture consisting of a water-pale liquid is substantially freed from tetrahydrofurane by distillation under moderately reduced pressure and brought to crystallization at a temperature of about 0° C. The crystalline product which separates in the course of a few hours is filtered off by suction, washed with ligroin and then dried. 10 grams of a white, practically pure crystalline product of the melting point 109° to 110° C., the bimolecular tri-(beta-phenyl-ethyl) borine carbonyl $[B(CH_2CH_2C_6H_5)_3CO]_2$ are obtained. After concentrating the filtrate and cooling it to about 0° C., a further 6 grams of the said compound are obtained in crystallized form and with the same melting point. By recrystallization from ligroin there is obtained a completely pure tri-(beta-phenyl-ethyl) borine carbonyl of the melting point 115° to 116° C. If the solvent is completely removed by distillation in vacuo, 93 grams of a further, but liquid, reaction product remain as residue.

Example 5

A solution of 1.6 grams of diborane in 120 ccs. of anhydrous tetrahydrofurane is charged while excluding air into a shaking autoclave of ¼ liter capacity which has been flushed out with nitrogen. After 50 atmospheres of a gas mixture consisting of equal parts by volume of dry ethylene and dry carbon monoxide which has been predried have been forced in, the autoclave is allowed to shake, the pressure thereby rapidly falling with an initial slight rise in temperature. By continuously after-forcing in of the same mixed gas, the pressure is kept first between 40 and 50 atmospheres and then, when the reaction has substantially died away, between 150 and 200 atmospheres until no further decrease in pressure is observable. After about 14 hours the pressure remains constant. A total of 217 atmospheres have been absorbed by the reaction mixture.

The autoclave is then decompressed and the contents consisting of a pale and clear liquid is first freed from tetrahydrofurane by distillation at atmospheric pressure. The remaining oily reaction product is fractionally distilled through a Vigreux column in a vacuum of 0.3 mm. Hg, the following fractions being thus obtained:

| | Grams |
|---|---|
| Boiling point 80° to 90° C | 3.2 |
| Boiling point 117° to 128° C | 0.9 |
| Boiling point 128° to 132° C | 3.5 |
| Residue | 1.5 |

The individual fractions are composed of triethyl borine carbonyls of different molecular size. Fraction I consists of dimolecular triethylborinecarbonyl of the formula $[B(C_2H_5)_3CO]_2$, fraction III of trimolecular triethylborine-carbonyl of the formula $[B(C_2H_5)_3CO]_3$ and the fraction II is composed of both compounds together.

Example 6

A solution of 1.6 grams of diborane in 120 ccs. of anhydrous tetrahydrofurane is treated while shaking, as described in Example 5, in a shaking autoclave at 22°

C. first at a pressure of 40 to 60 atmospheres and then at 80 to 100 atmospheres with dry carbon monoxide. In about 6 hours, a total of 40 atmospheres have been absorbed, the pressure decreasing in about 3 hours from 60 to 40 atmospheres then from 100 to 80 atmospheres and then remaining constant. The pressure is then raised to 130 atmospheres by forcing in dry ethylene. With a rise in temperature of 20° to 30° C., it again falls to 100 atmospheres. Then the pressure is kept by continuously forcing in more ethylene, first between 100 and 130 atmospheres (about 1½ hours) and then at 190 to 200 atmospheres (about 1½ hours), whereupon it remains constant. The pressure decrease during the ethylene treatment amounts in all to 60 atmospheres.

The reaction mixture consists of a water-white liquid which after distilling off the tetrahydrofurane at atmospheric pressure leaves behind an oily residue. This may be separated by fractional distillation in a vacuum of 0.3 mm. Hg into the following fractions:

|  | Grams |
|---|---|
| Boiling point 58° to 83° C | 0.8 |
| Boiling point 83° to 87° C | 1.25 |
| Boiling point 125° to 133° C | 2.15 |
| Boiling point 133° to 180° C | 0.95 |
| Residue | 2.1 |

The individual fractions are composed of triethyl borine carbonyls of different molecular size, the higher boiling fractions having a higher molecular weight than the lower boiling fractions.

Example 7

11.5 grams of diborane (obtained in known manner by reaction of lithium aluminum hydride with boron trifluoride in ethereal solution) are led immediately after their formation, in the gas phase, into 1550 grams of anhydrous tetrahydrofurane at about −10° to 0° C. and dissolved therein. Into this solution there are then led in gas phase at about −10° to +10° C. in the course of about 1 to 2 hours 93 grams of well dried propylene while stirring constantly. The reaction of the propylene with the diborane which proceeds, quantitatively to form normal-tripropyl boron, is strongly exothermic and appropriate cooling is necessary to maintain the said temperature. The solution thus obtained, with a content of 114 grams of normal-tripropyl boron, is sucked into a rolling autoclave which has been flushed out with nitrogen and then evacuated and has a capacity of 4.5 liters, while excluding air, and treated as described in Example 1 with carbon monoxide. By working up the contents of the autoclave there is obtained, after distilling off the tetrahydrofurane at atmospheric pressure, an oily product from which by fractional distillation in vacuo the same normal-tripropyl borine carbonyls of different molecular weight are obtained as in Example 1.

Example 8

A solution of 29 grams of tribenzyl boron, prepared according to Grignard from phenyl magnesium bromide and boron fluoride dietherate in ethereal solution, and 58 grams of anhydrous tetrahydrofurane are brought to reaction with carbon monoxide as described in Example 3.

In the course of about 2 hours, the amount of carbon monoxide corresponding to the theory is absorbed. The reaction mixture consists of a crystalline precipitate and a pale liquid. The liquid is filtered off by suction from the precipitate and the latter is washed with cooled tetrahydrofurane and dried. 22 grams of an only slightly contaminated dimeric tribenzyl borine carbonyl $(B(CH_2C_6H_5)_3CO)_2$ are obtained and by a single recrystallization from a mixture of tetrahydrofurane and acetonitrile it is obtained pure. The tetrahydrofurane is driven off from the filtrate and from the residual oily residue of 4.5 grams there is obtained by treatment with a mixture of tetrahydrofurane and acetonitrile, 1 gram of practically pure tribenzyl borine carbonyl of the melting point 213° C.

Example 9

A solution of 225 grams of tricyclo-octyl boron (prepared by gradual addition of cyclo-octene to a solution of diborane in tetrahydrofurane) and 370 grams of anhydrous tetrahydrofurane is reacted with carbon monoxide as described in Example 1. With a rise in temperature from 12° to 30° C., caused by the reaction heat which occurs, the amount of carbon monoxide corresponding to the theory is absorbed in the course of 2.5 hours. The reaction mixture, consisting of a white crystal pulp, is filtered off by suction, the crystalline residue on the suction filter washed with a little tetrahydrofurane and dried. There are first obtained 128 grams of dimeric tricyclo-octyl borine carbonyl $(B(C_8H_{15})_3CO)_2$, melting point 208° to 211° C. From the filtrate, upon addition of about 50 grams of acetonitrile, a further 54 grams of the product of the melting point 208° to 211° C. are caused to deposit. Finally, after separation of the solid product from the solution by filtration, there are obtained from the filtrate by concentration, another 45 grams of the dimeric tricyclo-octyl borine carbonyl of the melting point 207° to 210° C. as well as about 9 grams of an oily tricyclo-octyl borine carbonyl, probably of higher molecular weight.

Example 10

8.6 grams of diborane are led in gas phase into 870 grams of anhydrous tetrahydrofurane cooled to about 0° C. 40 grams of tri-normal-propyl boron diluted with 40 grams of tetrahydrofurane are dripped into the solution while stirring at about 0° C. in the course of about half an hour. The resultant clear, water-white liquid is sucked into a rolling autoclave of 3.1 liters capacity while excluding air, the rolling autoclave having been previously flushed out with nitrogen and evacuated. After at first 50 atmospheres of carbon monoxide have been forced in, the autoclave is allowed to rotate. With a slight rise in temperature (about 24° to 28° C.) the pressure falls rapidly. The pressure is gradually raised by subsequent forcing in of carbon monoxide and kept at between 180 and 200 atmospheres until no further decrease in pressure takes place, this being the case after 5 hours. The total absorption amounts to 110 atmospheres.

The pressure vessel is then decompressed and the contents, consisting of a water-clear liquid, after the tetrahydrofurane has been driven off under slightly reduced pressure, are distilled at an oil pump; 31 grams of an oily air-sensitive distillate of the boiling point 30° to 115° C. at 0.1 mm. Hg and 22 grams of a polymeric residue are obtained. By fractional distillation over a Vigreux column, there are obtained, besides mainly higher and non-unitary boiling products, 14 grams of normal-propyl borine carbonyl hydride $(BC_3H_7H_2CO)_2$ of the boiling point 47° C. at 0.1 mm. Hg.

We claim:

1. A compound of the general formula $[(BR_1R_2R_3)CO]_n$ wherein $n$ is an integer between 1 and 4, $R_1$ represents a radical selected from the group consisting of hydrogen, an alkyl radical with 2 to 18 carbon atoms, a cycloalkyl radical with 5 to 12 carbon atoms and an aralkyl radical, $R_2$ represents a radical selected from the group consisting of hydrogen, an alkyl radical with 2 to 18 carbon atoms a cycloalkyl radical with 5 to 12 carbon atoms and an aralkyl radical and $R_3$ represents a radical selected from the group consisting of an alkyl radical with 2 to 18 carbon atoms, a cycloalkyl radical with 5 to 12 carbon atoms and an aralkyl radical.

2. The compound of the formula $[B(C_2H_5)_3CO]_2$

3. The compound of the formula $$[B(C_2H_5)_3CO]_3$$

4. The compound of the formula $$[B(C_6H_{11})_3CO]$$

5. The compound of the formula $$[B(CH_2 \cdot CH_2 \cdot C_6H_5)_3CO]_2$$

6. The compound of the formula $$[B(C_8H_{15})_3CO]_2$$

7. The compound of the formula $$[BC_3H_7 \cdot H_2 \cdot CO]_2$$

8. A process for the production of borine carbonyls substituted by hydrocarbon radicals which comprises reacting an olefinically unsaturated hydrocarbon, carbon monoxide and diborane in the absence of water in an inert solvent at a temperature of from 0° to 150° C. under a pressure of 5 to 500 atmospheres.

9. A process for the production of borine carbonyls substituted by hydrocarbon radicals which comprises reacting diborane with carbon monoxide in an inert solvent in the absence of water at a pressure of 5 to 500 atmospheres and a temperature of from 0° to 150° C. and subsequently reacting the dissolved borine carbonyl with a mono-olefinically unsaturated hydrocarbon at the same temperature without isolating borine carbonyl.

10. A process for the production of borine carbonyls substituted by hydrocarbon radicals which comprises reacting diborane in an inert solvent in the absence of water with a mono-olefinically unsaturated hydrocarbon at atmospheric pressure and a temperature of from −30° to +100° C. while cooling the reaction mixture, and subsequently introducing carbon monoxide into the reaction mixture at a temperature of from 0° to 150° C. and a pressure of from 5 to 500 atmospheres.

11. A process for the production of borine carbonyls substituted by hydrocarbon radicals which comprises reacting a compound of the general formula $B(R_1R_2R_3)$, wherein each of $R_1$ and $R_2$ represents a radical selected from the group consisting of hydrogen, an alkyl radical with 2 to 18 carbon atoms, a cycloalkyl radical with 5 to 12 carbon atoms and an aralkyl radical and $R_3$ represents a radical selected from the group consisting of an alkyl radical with 2 to 18 carbon atoms, a cycloalkyl radical with 5 to 12 carbon atoms and an aralkyl radical, in an inert solvent in the absence of water with carbon monoxide at a pressure of 5 to 500 atmospheres and a temperature of from 0° to 150° C.

12. A process for the production of borine carbonyls substituted by hydrocarbon radicals which comprises reacting a compound of the general formula $B(R_1R_2R_3)$ wherein each of $R_1$ and $R_2$ represents a radical selected from the group consisting of hydrogen, an alkyl radical with 2 to 18 carbon atoms, a cycloalkyl radical with 5 to 12 carbon atoms and an aralkyl radical and $R_3$ represents a radical selected from the group consisting of an alkyl radical with 2 to 18 carbon atoms, a cycloalkyl radical with 5 to 12 carbon atoms and an aralkyl radical in an inert solvent in the absence of water with diborane and carbon monoxide at a pressure of from 5 to 500 atmospheres and a temperature of from 0° to 150° C.

No references cited.

UNITED STATES PATENT OFFICE
CERTIFICATION OF CORRECTION

Patent No. 3,006,961                      October 31, 1961

Walter Reppe et al.

It is hereby certified that error appears in the above numbered patent requiring correction and that the said Letters Patent should read as corrected below.

Column 4, line 21, for "pace" read -- place --; column 5, line 32, for "on" read -- off --.

Signed and sealed this 24th day of April 1962.

SEAL)
Attest:

ESTON G. JOHNSON
Attesting Officer

DAVID L. LADD
Commissioner of Patents